US008224246B2

(12) United States Patent
Suumäki et al.

(10) Patent No.: US 8,224,246 B2
(45) Date of Patent: Jul. 17, 2012

(54) DEVICE TO DEVICE CONNECTION SETUP USING NEAR-FIELD COMMUNICATION

(75) Inventors: Jan Suumäki, Lempäälä (FI); Andrea Bacioccola, Helsinki (FI)

(73) Assignee: Nokia Corporation, Espoo (FI)

( * ) Notice: Subject to any disclaimer, the term of this patent is extended or adjusted under 35 U.S.C. 154(b) by 94 days.

(21) Appl. No.: 12/776,874

(22) Filed: May 10, 2010

(65) Prior Publication Data

US 2011/0275316 A1 Nov. 10, 2011

(51) Int. Cl.
*H04B 5/00* (2006.01)
*H04B 7/00* (2006.01)
(52) U.S. Cl. ..................... 455/41.1; 455/41.2
(58) Field of Classification Search .......... 455/41.1, 455/41.2, 41.3, 411, 436
See application file for complete search history.

(56) References Cited

U.S. PATENT DOCUMENTS

| | | | |
|---|---|---|---|
| 6,757,531 B1 | 6/2004 | Haaramo et al. | |
| 7,471,200 B2 | 12/2008 | Otranen | |
| 7,821,399 B2 | 10/2010 | Otranen | |
| 2007/0001853 A1 | 1/2007 | Otranen | |
| 2008/0195788 A1 | 8/2008 | Tamir et al. | |
| 2009/0222659 A1 | 9/2009 | Miyabayashi et al. | |
| 2009/0271519 A1 | 10/2009 | Helvick | |
| 2010/0057969 A1 | 3/2010 | Meiri et al. | |
| 2010/0197224 A1 | 8/2010 | Lahdenniemi et al. | |

FOREIGN PATENT DOCUMENTS

| | | |
|---|---|---|
| EP | 1630712 | 1/2006 |
| EP | 1633104 | 8/2006 |

OTHER PUBLICATIONS

International Search Report dated Jul. 20, 2011 for PCT International Application No. PCT/FI2011/050281.
Wi-Fi Alliance; Wi-Fi Simple Configuration Specification V. 2.0 r42 unofficial draft-01; Feb. 9, 2010.
NFC Forum; Connection Handover; Technical Specification NFC Forum™ Connection Handover 1.1; NFCForum-TS-Connection Handover_1.1; Nov. 6, 2008.
Wi-Fi Alliance; Wi-Fi Protected Setup Specification; Version 1.0h; Dec. 2006.
NFC Digital Protocol Candidate Technical Specification, NFC Forum TM, NFCForum-TS-Digital Protocol-2009-Apr.-03.
NFC Activity Specification Candidate Technical Specification, NFC ForumTM, NFCForum-TS Activity-1.0_Candidate-1, Mar. 12, 2010.

(Continued)

*Primary Examiner* — Eugene Yun
(74) *Attorney, Agent, or Firm* — Locke Lord LLP

(57) ABSTRACT

Example method, apparatus, and computer program product embodiments are disclosed to enable near-field communication to be used in out-of-band initialization methods for connection setup for device-to-device communication. Example embodiments of the invention include a method comprising the steps of initiating, by a first device, an out-of-band near-field communication connection with a second device by transmitting wireless communication signals including necessary power for providing the near-field communication connection; sending a first short-range communication connection parameters for role determination, to the second device via the out-of-band near-field communication connection; receiving second short-range communication connection parameters for role determination, from the second device via the out-of-band near-field communication connection; selecting a role for the short-range communication connection by adopting short-range communication connection parameters for role determination that correspond to the role; discarding short-range communication connection parameters for role determination that are not adopted; and initiating the short-range communication connection according to the selected role using the adopted short-range communication connection parameters for role determination.

24 Claims, 9 Drawing Sheets

OTHER PUBLICATIONS

NFC Forum Connection Handover Technical Specification NFC Forum TM Connection Handover 1.1 NFCForum-TS-ConnectionHandover_1.1; Nov. 6, 2008.

NFC Forum; Logical Link Control Protocol; Technical Specification NFC Forum TM; LLCP 1.0; NFCForum-TS-LLCP 1.0: NFCForum-TS-LLCP_1.0; Dec. 11, 2009.

NFC Forum; NFC Data Exchange Format (NDEF) Technical Specification: NFC Forum TM; NDEF 1.0; NFCForum-TSNDEF_1.0; Jul. 24, 2006.

WiFi Alliance; Wi-Fi Protected Setup Specification Version 1.0h; Dec. 2006.

WiFi Alliance; WiFi Configuration Specification Version 2.0 r42 unofficial draft-01; Feb. 9, 2010.

FIG. 2B1
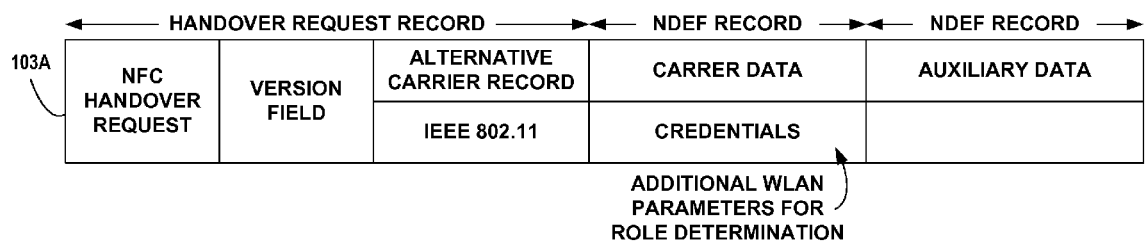
FIG. 2B2
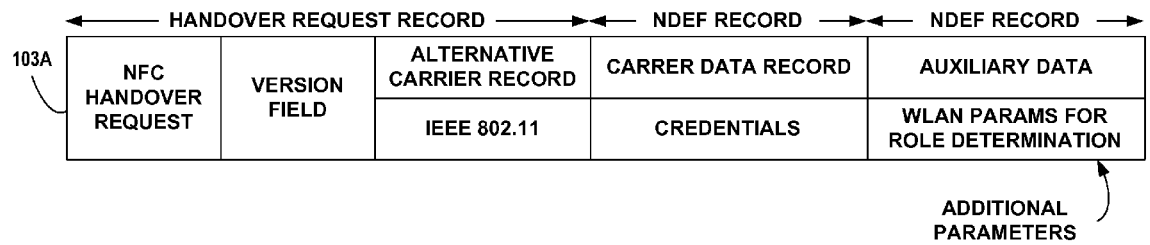

FIG. 2C1
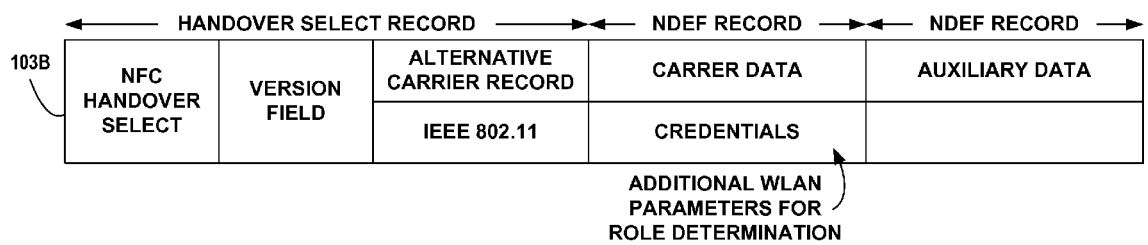
FIG. 2C2
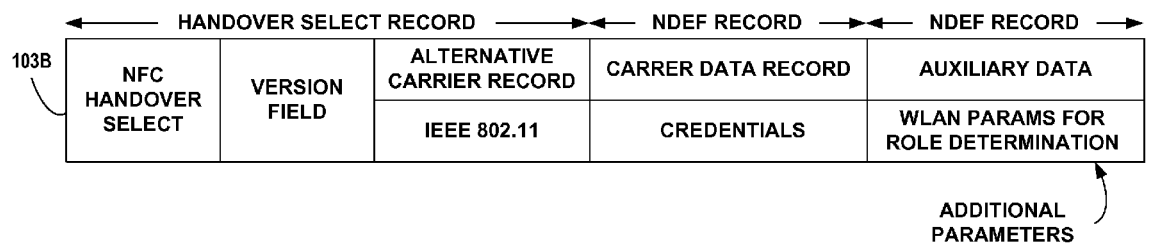

DEVICE TO DEVICE CONNECTION SETUP USING NEAR-FIELD COMMUNICATION

FIELD

The field of the invention relates to near-field communication, and more particularly to improvements to enable near-field communication to be used in out-of-band initialization methods for connection setup for device-to-device communication.

BACKGROUND

Modern society has adopted, and is becoming reliant upon, wireless communication devices for various purposes, such as connecting users of the wireless communication devices with other users. Wireless communication devices can vary from battery powered handheld devices to stationary household and/or commercial devices utilizing an electrical network as a power source. Due to rapid development of the wireless communication devices, a number of areas capable of enabling entirely new types of communication applications have emerged.

Cellular networks facilitate communication over large geographic areas. These network technologies have commonly been divided by generations, starting in the late 1970s to early 1980s with first generation (1G) analog cellular telephones that provided baseline voice communications, to modern digital cellular telephones. GSM is an example of a widely employed 2G digital cellular network communicating in the 900 MHZ/1.8 GHZ bands in Europe and at 850 MHz and 1.9 GHZ in the United States. While long-range communication networks, like GSM, are a well-accepted means for transmitting and receiving data, due to cost, traffic and legislative concerns, these networks may not be appropriate for all data applications.

Short-range communication technologies provide communication solutions that avoid some of the problems seen in large cellular networks. Bluetooth™ is an example of a short-range wireless technology quickly gaining acceptance in the marketplace. In addition to Bluetooth™ other popular short-range communication technologies include Bluetooth™ Low Energy, IEEE 802.11 wireless local area network (WLAN), Wireless USB (WUSB), Ultra Wide-band (UWB), ZigBee (IEEE 802.15.4, IEEE 802.15.4a), and ultra high frequency radio frequency identification (UHF RFID) technologies. All of these wireless communication technologies have features and advantages that make them appropriate for various applications.

Near field communication technologies, such s radio frequency identification (RFID) technologies, comprise a range of RF transmission systems, for example standardized and proprietary systems for a large number of different purposes, such as product tagging for inventory handling and logistics, theft prevention purposes at the point of sale, and product recycling at the end of the life-cycle of the tagged product. In addition to RFID technologies, Near Field Communication (NFC) technology has recently evolved from a combination of existing contactless identification and interconnection technologies. NFC is both a "read" and "write" technology. Communication between two NFC-compatible devices occurs when they are brought within close proximity of each other: A simple wave or touch can establish an NFC connection, which is then compatible with other known wireless technologies, such as Bluetooth™ or wireless local area network (WLAN).

SUMMARY

Method, apparatus, and computer program product embodiments are disclosed to enable near-field communication signals to be used in out-of-band initialization methods for device-to-device connection setup.

Example embodiments of the invention include a method comprising the steps of initiating, by a first device, an out-of-band near-field communication connection with a second device by transmitting wireless communication signals including necessary power for providing the near-field communication connection; sending a first short-range communication connection parameters for role determination, to the second device via the out-of-band near-field communication connection; receiving second short-range communication connection parameters for role determination, from the second device via the out-of-band near-field communication connection; selecting a role for the short-range communication connection by adopting short-range communication connection parameters for role determination that correspond to the role; discarding short-range communication connection parameters for role determination that are not adopted; and initiating the short-range communication connection according to the selected role using the adopted short-range communication connection parameters for role determination.

In example embodiments of the invention, the out-of-band near-field communication connection may be based on an NFC Forum Logical Link Control Protocol and the first and second devices use an NFC Forum Connection Handover protocol to exchange the first and second short-range communication connection parameters for role determination. An NFC handover request message sent to the second device in the NFC Forum Connection Handover protocol, includes an NDEF record to carry the parameters for role determination. The parameters for role determination may be carried in a carrier configuration data credential in a carrier data NDEF record. The short-range communication connection may be an IEEE 802.11 wireless network and the carrier configuration data credential includes an IEEE 802.11 Service Set Identifier, authentication and encryption type deployed by the wireless network, a network key that a wireless station needs to authenticate with the network, and a MAC address of a device receiving the configuration, if known. In example alternate embodiments of the invention, the parameters for role determination may carried in an auxiliary data NDEF record.

In example embodiments of the invention, an NFC handover select message received from the second device in the NFC Forum Connection Handover protocol, includes an NDEF record to carry the parameters for role determination. The parameters for role determination may be carried in a carrier configuration data credential in a carrier data NDEF record. The short-range communication connection may be an IEEE 802.11 wireless network and the carrier configuration data credential includes an IEEE 802.11 Service Set Identifier, authentication and encryption type deployed by the wireless network, a network key that a wireless station needs to authenticate with the network, and a MAC address of a device receiving the configuration, if known. In example alternate embodiments of the invention, the parameters for role determination may be carried in an auxiliary data NDEF record.

In example embodiments of the invention, the first device selects a registrar role for the short-range communication connection by adopting short-range communication connection parameters for role determination that correspond to the registrar role. The first device selects the registrar role by adopting the first short-range communication connection parameters and discards the second short-range communication connection parameters for role determination that may be not adopted.

In example embodiments of the invention, the first device selects an enrollee role for the short-range communication connection by adopting short-range communication connection parameters for role determination that correspond to the enrollee role. The first device selects the enrollee role by adopting the second short-range communication connection parameters and discards the first short-range communication connection parameters for role determination that may be not adopted.

In example embodiments of the invention, the step of selecting a role for the short-range communication connection may be made by negotiation over the out-of-band near-field communication connection, based on information in the first and second short-range communication connection parameters exchanged by the first and second devices.

In example embodiments of the invention, the step of selecting a role for the short-range communication connection may be made by negotiation over both the out-of-band near-field communication connection and over the short-range communication connection, based on information in the first and second short-range communication connection parameters exchanged by the first and second devices.

In example embodiments of the invention, after exchanging the first and second short-range communication connection parameters over the out-of-band near-field communication connection, the step of selecting a role may be made by negotiation over the short-range communication connection.

In example embodiments of the invention, a device, comprises:

at least one processor;

at least one memory including computer program code;

the at least one memory and the computer program code configured to, with the at least one processor, cause the device at least to:

initiate an out-of-band near-field communication connection with a second device by transmitting wireless communication signals including necessary power for providing the near-field communication connection;

send first short-range communication connection parameters for role determination, to the second device via the out-of-band near-field communication connection;

receive second short-range communication connection parameters for role determination, from the second device via the out-of-band near-field communication connection;

select a role for the short-range communication connection by adopting short-range communication connection parameters for role determination that correspond to the role;

discard short-range communication connection parameters for role determination that are not adopted; and initiate the short-range communication connection according to the selected role using the adopted short-range communication connection parameters for role determination.

In example embodiments of the invention, a computer readable medium storing program instructions, which when executed by a computer processor, perform the steps comprising:

initiating an out-of-band near-field communication connection with a second device by transmitting wireless communication signals including necessary power for providing the near-field communication connection;

sending first short-range communication connection parameters for role determination, to the second device via the out-of-band near-field communication connection;

receiving second short-range communication connection parameters for role determination, from the second device via the out-of-band near-field communication connection;

selecting a role for the short-range communication connection by adopting short-range communication connection parameters for role determination that correspond to the role;

discarding short-range communication connection parameters for role determination that are not adopted; and initiating the short-range communication connection according to the selected role using the adopted short-range communication connection parameters for role determination.

The resulting embodiments enable near-field communication signals to be used in out-of-band initialization methods for device-to-device connection setup for Wi-Fi networks.

DESCRIPTION OF THE FIGURES

FIG. 2B1 is an example embodiment NFC handover request message format with the additional WLAN parameters for role determination in the carrier data NDEF record, according to an embodiment of the present invention.

FIG. 2B2 is an example embodiment NFC handover request message format with the additional WLAN parameters for role determination in the auxiliary data NDEF record, according to an embodiment of the present invention.

FIG. 2C1 is an example embodiment NFC handover select message format with the additional WLAN parameters for role determination in the carrier data NDEF record, according to an embodiment of the present invention.

FIG. 2C2 is an example embodiment NFC handover select message format with the additional WLAN parameters for role determination in the auxiliary data NDEF record, according to an embodiment of the present invention.

DISCUSSION OF EXAMPLE EMBODIMENTS OF THE INVENTION

Figure 1A:
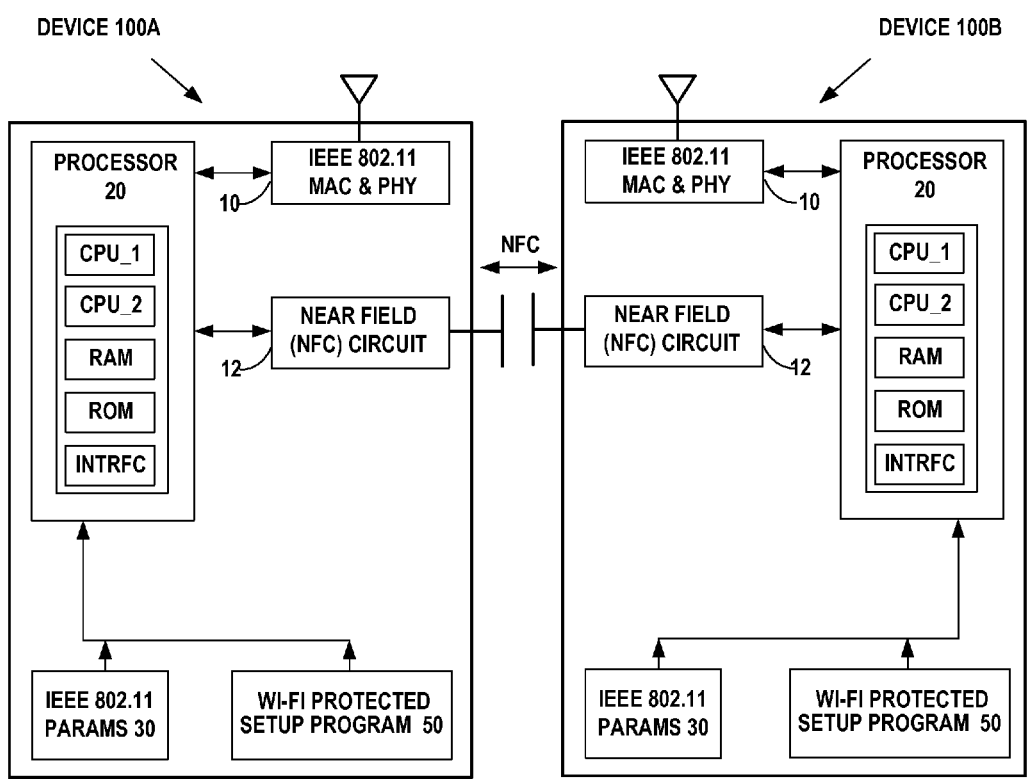
FIG. 1A is an example embodiment of a wireless network diagram of two wireless devices capable of forming a WLAN device-to-device network using technologies such as the IEEE 802.11 IBSS (Ad Hoc) and Wi-Fi Direct, by using near-field communication (NFC) signals in an out-of-band device-to-device connection setup, according to an embodiment of the present invention.

Wi-Fi refers to the family of related IEEE 802.11 specifications that specify methods and techniques of wireless local area network (WLAN) operation. Examples include the IEEE 802.11b and 802.11g wireless local area network specifications, which have been a staple technology for traditional Wi-Fi applications in the 2.4 GHz ISM band. Emerging broadband applications have stimulated interest in developing very high-speed wireless networks for short range communication, for example, the IEEE 802.11n, the planned IEEE 802.11ac, and the planned IEEE 802.11ad WLAN specifications that are to provide a very high throughput in higher frequency bands. Wi-Fi applications include 802.11 products such as consumer electronics, telephones, personal computers, and access points for both for home and small office.

In an example application of Wi-Fi, a wireless router may be connected through a cable modem or DSL modem to the Internet and serves as a wireless access point for personal computers equipped with a wireless network interface card and for other wireless devices such as wireless repeaters using a Wi-Fi standard. Setting up a wireless router Wi-Fi network includes configuring the nodes of the network with security features enabled by the Wi-Fi network standard.

The Wi-Fi Alliance published the Wi-Fi Protected Setup (WPS) specification 1.0, *Wi-Fi Protected Setup Specification*, Version 1.0h, December 2006 (incorporated herein by reference), to facilitate the initial setting up of 802.11 devices in a Wi-Fi infrastructure network so that they may be more easily configured with security features and so that that new Wi-Fi devices may be added to the network. One of the methods provided by the Wi-Fi Protected Setup (WPS) Specification 1.0 is the Near-Field Communication (NFC) method, in which the user brings a new wireless client device (STA) close to an access point (AP) or Registrar of the Network to allow near field communication between the devices.

Near-field communication (NFC) technology used in the Wi-Fi Protected Setup (WPS) standard, communicates between two NFC Devices or between an NFC Device and an NFC Tag via magnetic field induction, where two loop antennas are located within each other's near field, effectively energizing a wireless contact by forming an air-core transformer. An example NFC radio operates within the unlicensed radio frequency ISM band of 13.56 MHz, with a bandwidth of approximately 2 MHz over a typical distance of a few centimeters. The NFC radio may be affixed to a new wireless client device (STA) and the user brings the NFC radio on the device close to an access point (AP) or Registrar of the Network to allow near field communication between the devices. NFC technology is an extension of the ISO/IEC 14443 proximity-card standard (incorporated herein by reference) for contactless smartcards and radio frequency ID (RFID) devices, which combines the interface of a contactless smartcard and a reader into a single device, and uses the ISO/IEC 18092 NFC communication standard (incorporated herein by reference) to enable two-way communication. An NFC radio may communicate with both existing ISO/IEC 14443 contactless smartcards and readers, as well as with other NFC devices by using ISO/IEC 18092. The NFC Forum™, a non-profit industry association, has released specifications that enable different operation modes called: tag emulation, read/write mode, and peer to peer communication. Furthermore, NFC Forum has defined specifications for NFC Data Exchange Format (NDEF), NFC Tag Types, NFC Record Type Definition, and Connection Handover Specification. See, for example, *Connection Handover Technical Specification*, NFC Forum™, Connection Handover 1.1, NFCForum-TS-ConnectionHandover_1.1, 2008-11-06 (incorporated herein by reference). The ISO/IEC 18092 standard defines communication modes for Near Field Communication Interface and Protocol (NFCIP-1) using inductively coupled devices operating at the center frequency of 13.56 MHz for interconnection of computer peripherals. The ISO/IEC 18092 standard specifies modulation schemes, codings, transfer speeds and frame format of the RF interface, initialization schemes, conditions required for data collision control during initialization, and a transport protocol including protocol activation and data exchange methods.

The WPS 1.0 standard defines three types of components in a network: a Registrar, an Enrollee, and an Access Point (AP). A Registrar is a component with the authority to issue and revoke credentials to a network. A Registrar may be integrated into an AP or it may be separate from the AP. An Enrollee is a component seeking to join a wireless LAN network. An Authenticator is an AP functioning as a proxy between a Registrar and an Enrollee. A Registrar wireless device configures the Enrollee wireless device, and the AP acts as an Authenticator to proxy the relevant messages between the Registrar and the Enrollee. The messages exchanged in the session are a series of Extensible Authentication Protocol (EAP) request/response messages, ending with the Enrollee reconnecting to the network with its new configuration. EAP is an authentication framework defined in RFC 5247, for providing the transport and usage of keying material and parameters needed to establish a secure Wi-Fi network. The Wi-Fi Protected Setup (WPS) 2.0 specification (to be published) updates the NFC setup method for WLAN Infrastructure mode that includes an access point (AP), and is not applicable to WLAN device-to-device (D2D) connection setup.

The Wi-Fi Protected Setup (WPS) 1.0 specification published by the Wi-Fi Alliance, *Wi-Fi Protected Setup Specification*, Version 1.0h, December 2006, defines a near-field communication (NFC) setup method for IEEE 802.111 WLAN Infrastructure setup that includes an access point (AP), and is currently the only official WPS specification. The access point (AP) defines the roles of registrar and enrollee for the requesting device and the selecting device. The Wi-Fi Protected Setup (WPS) 2.0 specification (to be published) updates the NFC setup method for WLAN Infrastructure mode that includes an access point (AP), but is not applicable to WLAN device-to-device (D2D) connection setup. Current WLAN device-to-device technologies include the IEEE 802.11 IBSS (Ad Hoc) and Wi-Fi Direct networks.

The basic handover to a Wi-Fi carrier stores wireless LAN parameters and credentials on NFC Forum Tags as part of its Wi-Fi Protected Setup (WPS) specification 1.0. The information is stored in the payload of an NFC Data Exchange Format (NDEF) record identified by the mime-type "application/vnd.wfa.wsc", known as the "WPS Record". The wireless LAN parameters and credentials information provided inside a WPS Record includes the IEEE 802.11 Service Set Identifier (SSID), authentication and encryption type deployed by the wireless network, the secret network key that a wireless station needs to authenticate with the network, and the MAC address of the device receiving the configuration (if unknown, this address is set to all-zeros). The WPS specification 1.0 uses the term "Registrar" for a device that is able to provide WLAN credentials and "Enrollee" for a device that wants to join a wireless network.

In the WPS specification 2.0 (to be published), a Handover Requester with Wi-Fi capability may format an NFC Handover Request Message in the NFC Data Exchange Format (NDEF), that indicates that the requester is an IEEE 802.11 device, but which does not include any configuration information. A Handover Request may be sent via the NFC link in at least two scenarios: [1] the requester may not have yet joined a wireless domain or [2] even if the requester is already member of a WLAN network, a peer device may be in different network and thus a Connection Handover is required to obtain the peer device's credentials. In the WPS specification 2.0, the Handover Selector would deduce from this message that the Handover Requester supports a Wi-Fi certified IEEE 802.11 radio. In the WPS specification 2.0, if the Handover Selector is a Wi-Fi device with wireless connectivity, it should respond with an NFC Handover Select Message in the NFC Data Exchange Format (NDEF), with a configuration record that includes credentials, such as network index, SSID, authentication type, encryption type, network key, and MAC address.

The NFC Data Exchange Format (NDEF) specification, *NFC Forum Data Exchange Format (NDEF) Specification*, NFC Forum™, 2006 (incorporated herein by reference), defines a common data format for NFC devices to exchange application or service specific data. An NDEF message is constructed of a number of NDEF records, with the first and the last record providing message begin and end markers. Between two NFC Devices, NDEF messages may be exchanged over the NFC Logical Link Control Protocol (LLCP) protocol, specified in *NFC Forum Logical Link Control Protocol Specification*, NFC Forum™, 2009 (incorporated herein by reference). The NFC Connection Handover specification, *NFC Forum Connection Handover Specification*, NFC Forum™, 2008 (incorporated herein by reference), defines the exchange of NDEF messages between two NFC Devices in a negotiated handover to discover and negotiate alternative wireless communication technologies.

The Handover Requester in the WPS specification 2.0, would then typically use the SSID and Network Key to enroll on the same Wi-Fi network to which the Handover Selector is connected. Further possible actions depend on the provision of an IP address identifying the Handover Selector, the available services, and the Handover Requester's intended activity.

The Wi-Fi Alliance is preparing a new WLAN device-to-device specification entitled Wi-Fi Direct, to enable Wi-Fi devices to connect to one another, point-to-point, without joining a network. The specification may be implemented in any Wi-Fi device. Devices that support the specification will be able to discover one another and advertise available services. Wi-Fi Direct devices will support typical Wi-Fi ranges and the same data rates as can be achieved with an infrastructure connection. Wi-Fi Direct provides point-to-point connections for networks by embedding a software access point into any device that wishes to support Wi-Fi Direct. The soft AP provides a version of Wi-Fi Protected Setup 1.0 by entering a PIN or pressing a button. When a device enters the range of the Wi-Fi Direct host, it may connect to it using the existing protocol, and then gather setup information using a Wi-Fi Protected Setup 1.0 transfer.

Since there is no access point AP in a device-to-device network, as is required in Wi-Fi Protected Setup 1.0, in Wi-Fi Protected Setup 2.0, and in Wi-Fi Direct, neither the requesting device nor the selecting device will know whether it is a Registrar device or an Enrollee device when using near-field communication signals in an out-of-band device-to-device connection setup. Thus, changes must be made to the existing Wi-Fi Protected Setup (WPS) 2.0 specification, to enable setting up a device-to-device wireless network with a second wireless device, using near-field communication signals in the out-of-band device-to-device connection setup. The method, apparatus, and computer program product embodiments disclosed herein enable near-field communication signals to be used in out-of-band initialization methods for device-to-device connection setup for Wi-Fi networks, without a controlling Access Point.

FIG. 1A is an example embodiment of a wireless network diagram of two wireless devices capable of forming a network in WLAN device-to-device technologies such as the IEEE 802.11 IBSS (Ad Hoc) and Wi-Fi Direct, by using near-field communication (NFC) signals in an out-of-band device-to-device connection setup, according to an embodiment of the present invention.

Example embodiments of the invention may operate in various network topologies, including Independent BSS (IBSS), IEEE 802.11 Peer-to-peer BSS, and Mesh BSS (MBSS). Example embodiments of the invention may operate in all frequency bands, for example the 2.4 GHz ISM band, the 5.0 GHz band for the IEEE 802.11ac standard, up beyond the 60 GHz band for the IEEE 802.11ad standard.

For example, the wireless device 100A may be a communications device, PDA, cell phone, laptop or palmtop computer, or the like. The wireless device 100A includes a processor 20, which includes a dual core central processing unit (CPU_1 and CPU_2), a random access memory (RAM), a read only memory (ROM), and interface circuits to interface with one or more radio transceivers 10, battery and other power sources, key pad, touch screen, display, microphone, speakers, ear pieces, camera or other imaging devices, etc. in the devices 100A. The RAM and ROM can be removable memory devices such as smart cards, SIMs, WIMs, semiconductor memories such as RAM, ROM, PROMS, flash memory devices, etc. The IEEE 802.11 MAC and PHY 10 provide the medium access control and radio for IEEE 802.11 WLAN communications.

The NFC circuit 12 in device 100A, used in the Wi-Fi Protected Setup (WPS) standard, communicates bidirectionally with NFC circuit 12 in device 100B via magnetic field induction, where two loop antennas are located within each other's near field, effectively energizing a wireless contact by forming an air-core transformer. An example NFC radio of NCF circuit 12 operates within the unlicensed radio frequency ISM band of 13.56 MHz, with a bandwidth of approximately 2 MHz over a typical distance of a few centimeters. The NFC circuit 12 may be affixed to a new wireless client device 100A and the user brings the NFC radio on the device close to the NFC circuit 12 of the second device 100B to allow near field, bidirectional communication between the devices. NFC technology is an extension of the ISO/IEC 14443 proximity-card standard for contactless smartcards and radio frequency ID (RFID) devices, which combines the interface of a contactless smartcard and a reader into a single device, and uses the ISO/IEC 18092 NFC communication standard to enable two-way communication. An NFC radio may communicate with both existing ISO/IEC 14443 contactless smartcards and readers, as well as with other NFC devices by using ISO/IEC 18092.

When two NFC Devices 100A and 100B are brought into close proximity, they may establish NFC communication based on the NFC Forum Logical Link Control Protocol (LLCP) specification. If one of the devices 100A has intention to activate a further (wireless) communication method, it may then use the NFC Forum Connection Handover protocol to announce possible communication means, including its suggestion for configuration data, and request the other device 100B to respond with its selection of matching technologies, including its suggestion for configuration data. When an NFC requestor device 100A has established LLCP communication with an NFC selector device 100B, the requestor device 100A sends a handover request message 103A with its suggestion for WLAN parameters for role determination. The NFC selector device 100B responds with a handover select message 103B with its suggestion for WLAN parameters for role determination.

In example embodiments of the invention, the NFC circuit 12 in devices 100A and/or 100B of FIG. 1A may be a contactless smartcard and a reader having characteristics similar to those described in the ISO/IEC 14443 proximity-card standard, the smartcard and reader being associated or combined as a single component capable of two-way communication, and uses the ISO/IEC 18092 NFC communication standard to enable both devices 100A and 100B send credentials to each other, according to an embodiment of the present invention.

The IEEE 802.11 parameters 30 may include the wireless LAN parameters and credentials information for the IEEE 802.11 Service Set Identifier (SSID), authentication and encryption type deployed by the wireless network, the secret network key that a wireless station needs to authenticate with the network, and the MAC address of the device receiving the configuration (if unknown, this address is set to all-zeros).

Wi-Fi Protected Setup Program 50 may include changes provided by the example embodiments of the invention to the existing Wi-Fi Protected Setup (WPS) 2.0 specification, to enable setting up a device-to-device wireless network with a second wireless device, using near-field communication signals in the out-of-band device-to-device connection setup. Also included are the existing Wi-Fi Protected Setup (WPS) 2.0 specification methods for NFC, including the Connection Handover specified for Infrastructure WLAN setup, Password Token (tag) for Infrastructure WLAN setup, and Configuration Token (tag) for Infrastructure WLAN setup.

The MAC 10, Wi-Fi Protected Setup Program 50, and IEEE 802.11 parameters 30 may be embodied as program logic stored in the RAM and/or ROM in the form of sequences of programmed instructions which, when executed in the CPU, carry out the functions of the disclosed embodiments. The program logic can be delivered to the writeable RAM, PROMS, flash memory devices, etc. of the wireless device 100A from a computer program product or article of manufacture in the form of computer-usable media such as resident memory devices, smart cards or other removable memory devices, or in the form of program logic transmitted over any transmitting medium which transmits such a program. Alternately, they can be embodied as integrated circuit logic in the form of programmed logic arrays or custom designed application specific integrated circuits (ASIC). The one or more PHY radios 10 in the wireless device 100A may be separate transceiver circuits or alternately, the one or more radios 10 may be a single RF module capable of handling one or multiple channels in a high speed, time and frequency multiplexed manner in response to the processor 20. Both device A and device B may have the same or similar components as described for device A.

Figure 1B:
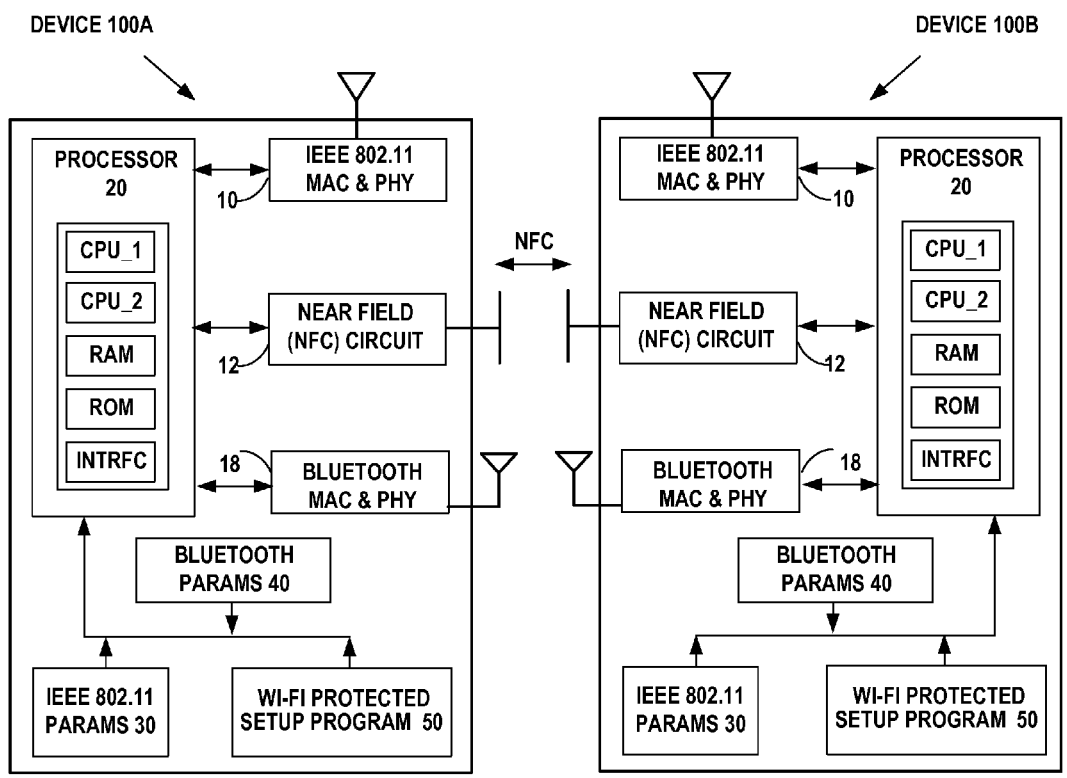
FIG. 1B is an example embodiment of a wireless network diagram of two wireless devices capable of forming either an IEEE 802.11 IBSS ad hoc network or a Bluetooth ad hoc network by using near-field communication signals in an out-of-band device-to-device connection setup, according to an embodiment of the present invention.

FIG. 1B is an example embodiment of a wireless network diagram of two wireless devices capable of forming either an IEEE 802.11 IBSS ad hoc network or a Bluetooth ad hoc network by using near-field communication signals in an out-of-band device-to-device connection setup, according to an embodiment of the present invention. Two or more alternative sets of credentials may be sent by the device A to the device B and two or more alternative sets of credentials may be sent by the device B to the device A, allowing the devices A and B to negotiate which network type would be more appropriate in the proposed network setup. A Bluetooth MAC and PHY 18 are provided and Bluetooth parameters 40 are included, having similar types of credentials as in the IEEE 802.11 parameters 30. In the example, the application running on the Handover Requester, device 100A, first sends its credentials 103A, including the alternative carriers Wi-Fi and Bluetooth wireless technology, to the Handover Selector, device 100B. The Handover Selector, 100B, then responds by replying with its credentials 103B, including the alternative carriers, Wi-Fi and Bluetooth wireless technology, to the Handover Requester, device 100A. Devices 100A and 100B may then negotiate between themselves as to which carrier and other parameters are to be adopted for subsequent communication between the devices.

Figure 1C:
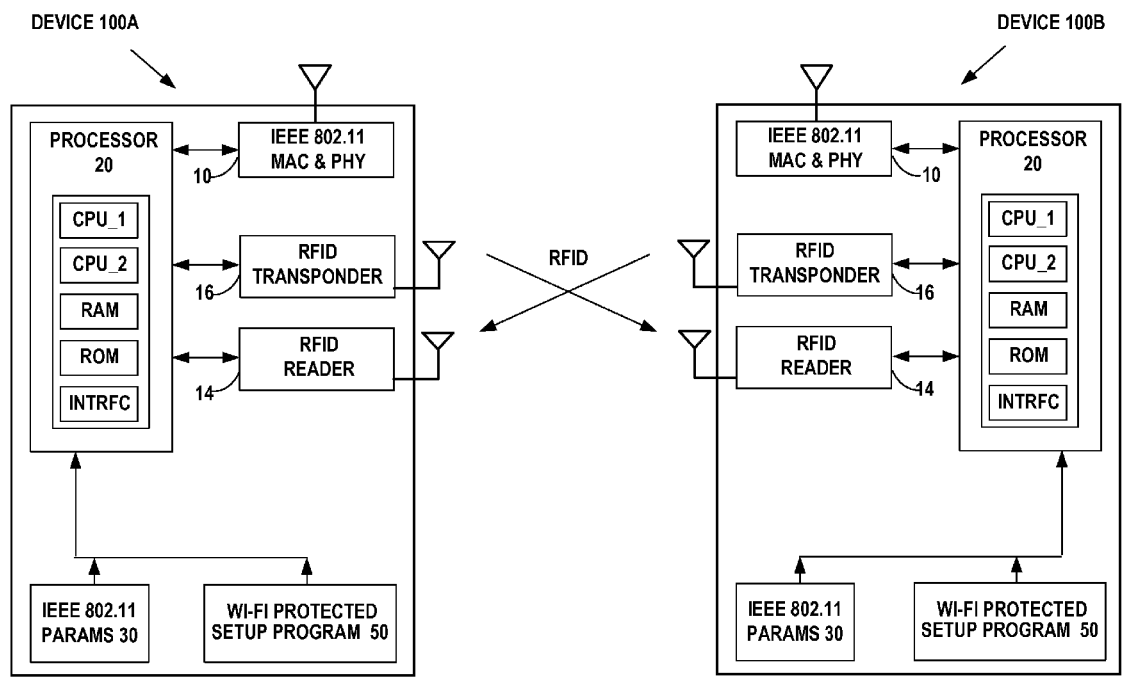
FIG. 1C is an example embodiment of a wireless network diagram of two wireless devices capable of forming an IEEE 802.11 IBSS ad-hoc network by using radio frequency identification (RFID) signals in an out-of-band device-to-device connection setup. Both an RFID transponder and an RFID reader circuit are included in each of the wireless devices to enable both devices send credentials to each other, according to an embodiment of the present invention.

FIG. 1C is an example embodiment of a wireless network diagram of two wireless devices capable of forming an IEEE 802.11 IBSS ad-hoc network by using radio frequency identification (RFID) signals in an out-of-band device-to-device connection setup. In example embodiments of the invention, the NFC circuit 12 in device 100A and/or 100B of FIG. 1A may be an RFID transponder 16 and an RFID reader circuit 14 as shown in FIG. 1C, associated or combined as a single component capable of two-way communication to enable both devices 100A and 100B send credentials to each other, according to an embodiment of the present invention.

RFID transponders 16 used in the Wi-Fi Protected Setup (WPS) standard may be the passive type or the active type. A passive RFID transponder requires no internal power source to communicate with an RFID reader 14, and is only active when it is near an RFID reader 14, which energizes the transponder 16 with a continuous radio frequency signal at a resonant frequency of the antenna. The small electrical current induced in the antenna by the continuous radio frequency signal provides enough power for the integrated circuit in the transponder to power up and transmit a modulated response, typically by backscattering the continuous carrier wave from the RFID reader. A passive RFID transponder may include writable electrically erasable, programmable, read-only memory (EEPROM) for storing data received from the RFID reader, which modulates the continuous carrier wave sent by the RFID reader. Reading distances for passive RFID transponders typically range from a few centimeters to a few meters, depending on the radio frequency and antenna design. By contrast, active RFID transponders require a power source to receive and transmit information with an RFID reader. The RFID transponder may be affixed to a new wireless client device 100A and the user brings the RFID transponder 16 on the device 100A close to the reader 14 a device 100B to allow near field communication between the devices.

Figure 2A:
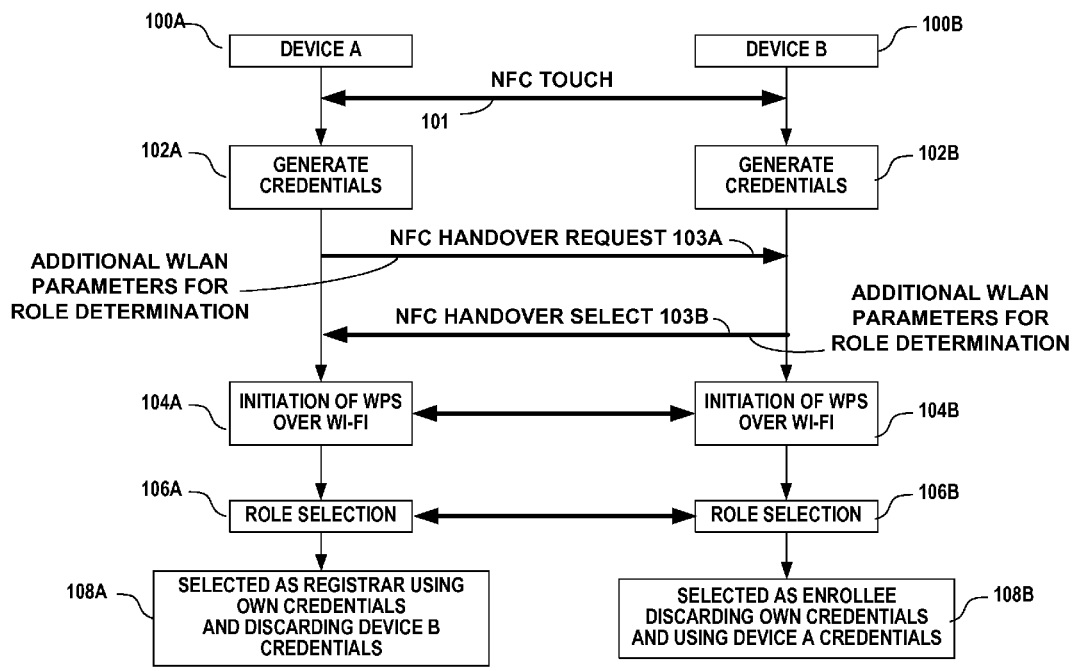
FIG. 2A is an example embodiment of a sequence diagram of the two wireless devices of FIG. 1A, according to an embodiment of the present invention, wherein near-field communication (NFC) is used as an out-of-band initialization method for device-to-device connection setup for Wi-Fi, by having both devices send credentials to each other, since the roles of the devices is not known in the beginning when performing the NFC touch operation to set-up up the Wi-Fi connection. After the device roles have been determined, only the appropriate set of credentials is used and the other set is discarded, according to an embodiment of the present invention.

FIG. 2A is an example embodiment of a sequence diagram of the two wireless devices 100A and 100B of FIG. 1A, according to an embodiment of the present invention, wherein near-field communication (NFC) is used as an out-of-band initialization method for device-to-device connection setup for Wi-Fi. The NFC touch or energization 101 takes place when the NFC circuits are placed in close proximity. Device A generates credentials 102A and sends them to device B in the NFC handover request 103A. Device B generates credentials 102B and sends them to device A in the NFC handover select 103B. Device A initiates the WPS over Wi-Fi procedure at 104A. Device B initiates the WPS over Wi-Fi procedure at 104B. Both devices send credentials to each other, since the roles of the devices are not known in the beginning when performing the NFC touch operation 101 to set-up up the Wi-Fi connection. Devices A and B perform a negotiated role selection at 106A and 106B. After the device roles have been determined, only the appropriate set of credentials is used and the other set is discarded, according to an embodiment of the present invention. As a result of the negotiation between the devices, device A at 108A is selected as the registrar using its own credentials and it discards device B's credentials. Device B at 108B is selected as the enrollee and it discards its own credentials and uses device A's credentials.

In some example embodiments of the invention, the selecting of the roles of registrar and enrollee may be made based solely on the information in the two respective Wi-Fi credentials exchanged by the two devices.

In other example embodiments of the invention, the selecting of the roles of registrar and enrollee may be made by negotiation over the out-of-band near-field communication connection, based on the two respective Wi-Fi credentials exchanged by the two devices.

In still other example embodiments of the invention, the selecting of the roles of registrar and enrollee may be made by negotiation over both the out-of-band near-field communication connection and over the in-band operating frequency of the devices, based on the two respective Wi-Fi credentials exchanged by the two devices.

FIG. 2B1 is an example embodiment NFC handover request message format with the FIG. 2B1 is an example embodiment NFC handover request message format with the additional WLAN parameters for role determination in the carrier data NDEF record, sent by the requestor over the NFC link, according to an embodiment of the present invention. A new NDEF record is added to carry the additional information needed for role determination. NDEF messages enable a handover requester to negotiate the additional WLAN parameters for role determination with the handover selector over the NFC link. The handover request message is composed of a handover request record that identifies the version of the handover specification being used, and the alternative carrier record that identifies the target carrier type to which that handover is directed, such as a handover from the NFC link to an IEEE 802.11 WLAN link. The handover request record may have a plurality of alternative carrier records, one for each of a plurality of possible target carriers. The handover request record is followed by several NDEF records. Each alternative carrier record in the handover request record includes pointers to related NDEF records. The first NDEF record pointed to by an alternative carrier record contains carrier data characterizing the intended target carrier, such as IEEE 802.11. The following NDEF record pointed to by the alternative carrier record contains auxiliary data associated with the intended target carrier or other information related to the handover to the target carrier.

There are two alternatives for locating the additional information needed for role determination being sent in the handover request message; either including the additional WLAN parameters for role determination in the carrier data NDEF record, as shown in FIG. 2B1, or alternately including the additional WLAN parameters for role determination in the auxiliary data NDEF record, as shown in FIG. 2B2. FIG. 2B2 is an example embodiment NFC handover request message format with the additional WLAN parameters for role determination in the auxiliary data NDEF record, sent by the requestor over the NFC link, according to an embodiment of the present invention.

The handover select messages sent from the selector to the requestor are similarly constructed as are the handover request messages. A new NDEF record is added to carry the additional information needed for role determination. FIG. 2C1 is an example embodiment NFC handover select message format with the additional WLAN parameters for role determination in the carrier data NDEF record, sent by the selector over the NFC link, according to an embodiment of the present invention. In an alternative embodiment, FIG. 2C2 is an example embodiment NFC handover select message format with the additional WLAN parameters for role determination in the auxiliary data NDEF record, sent by the selector over the NFC link, according to an embodiment of the present invention.

In further example embodiments of the invention, after exchanging the two respective Wi-Fi credentials over the out-of-band near-field communication connection between the two devices, the selecting of the roles of registrar and enrollee may be made by negotiation over the in-band operating frequency of the devices, for example employing IEEE 802.11 MAC frames (See the base standard IEEE 802.11-2007, Sec. 7. Frame formats, incorporated herein by reference).

Figure 3:
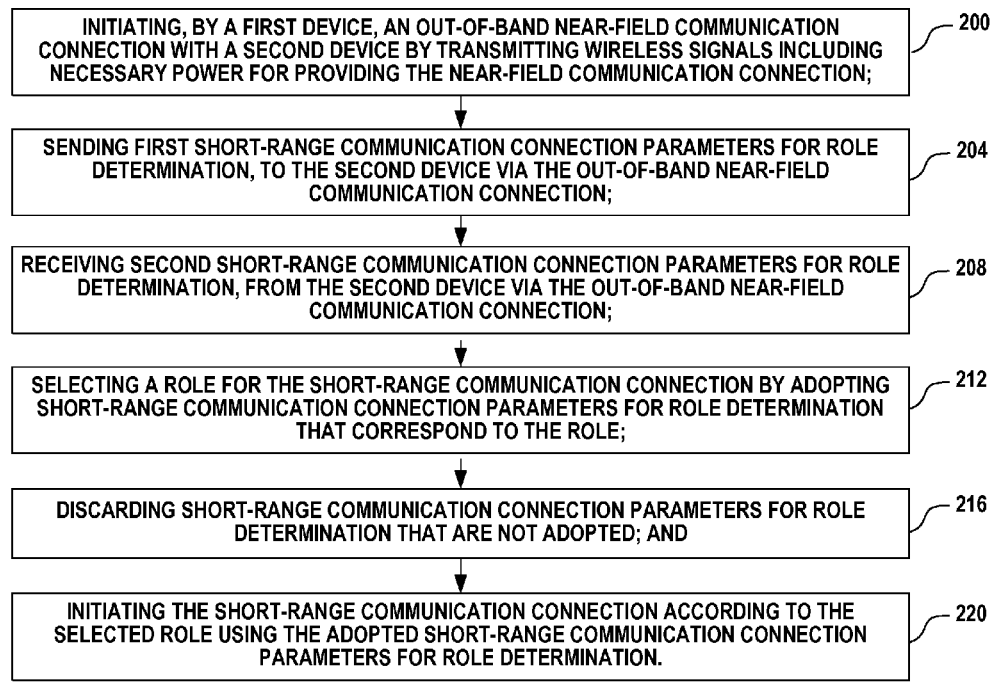
FIG. 3 is an example embodiment of a flow diagram of operational steps of an example embodiment of the method carried out between the two wireless devices of FIG. 1A, from the point of view of the device assuming the role of the registrar for device-to-device connection setup for Wi-Fi, according to an embodiment of the present invention.

FIG. 3 is an example embodiment of a flow diagram of operational steps of an example embodiment of the method carried out between the two wireless devices of FIG. 1A, from the point of view of the device assuming the role of the registrar for device-to-device connection setup for Wi-Fi, according to an embodiment of the present invention. The steps of the flow diagram represent computer code instructions stored in the RAM and/or ROM memory of the wireless device 100A or 100B, which when executed by the central processing units (CPU), carry out the functions of the example embodiments of the invention. The steps may be carried out in another order than shown and individual steps may be combined or separated into component steps. The steps of the example method are as follows.

Step 200: initiating, by a first device, an out-of-band near-field communication connection with a second device by transmitting wireless communication signals including necessary power for providing the near-field communication connection;

Step 204: sending first short-range communication connection parameters for role determination, to the second device via the out-of-band near-field communication connection;

Step 208: receiving second short-range communication connection parameters for role determination, from the second device via the out-of-band near-field communication connection;

Step 212: selecting a role for the short-range communication connection by adopting short-range communication connection parameters for role determination that correspond to the role;

Step 216: discarding short-range communication connection parameters for role determination that are not adopted; and Step 220: initiating the short-range communication connection according to the selected role using the adopted short-range communication connection parameters for role determination.

Figure 4:
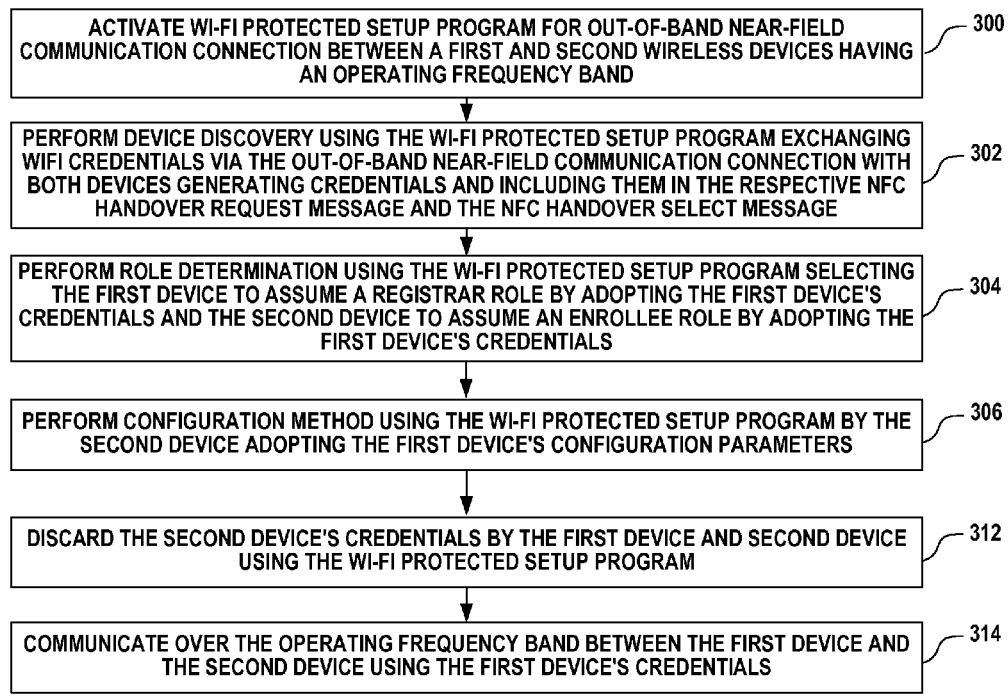
FIG. 4 is an example embodiment of a flow diagram of operational steps of an example embodiment of the method carried out between the two wireless devices of FIG. 1A, to enable wireless devices in WLAN device-to-device technologies such as the IEEE 802.11 IBSS (Ad Hoc) and Wi-Fi Direct, to use near-field communication signals in out-of-band device-to-device connection setup.

FIG. 4 is an example embodiment of a flow diagram of operational steps of an example embodiment of the invention carried out between the two wireless devices of FIG. 1A, to enable wireless devices in WLAN device-to-device technologies such as the IEEE 802.11 IBSS (Ad Hoc) and Wi-Fi Direct, to use near-field communication signals in out-of-band device-to-device connection setup.

Step 300: Activate Wi-Fi Protected Setup program for out-of-band near-field communication connection between a first and second wireless devices having an operating frequency band. The setup method may be manually selected or automatically selected.

Step 302: Perform device discovery using the Wi-Fi Protected Setup program exchanging Wi-Fi credentials via the out-of-band near-field communication connection between the first and second wireless devices. If the NFC touch has been performed before role determination, then both devices generate credentials and include them in the respective NFC Handover Request message and the NFC Handover Select message.

Step 304: Perform role determination using the Wi-Fi Protected Setup program selecting the first device to assume a registrar role by adopting the first device's credentials and the second device to assume an enrollee role by adopting the first device's credentials. Each device has sent its credentials to the other device. The role may be automatically selected as a result of the service discovery. After role determination, only the appropriate set of credentials is maintained, the other set is discarded Step 306: Perform configuration method using the Wi-Fi Protected Setup program by the second device adopting the first device's configuration parameters.

Step 312: Discard the second device's credentials by the first device and second device using the Wi-Fi Protected Setup program Step 314: Communicate over the operating frequency band between the first device and the second device using the first device's credentials.

Wi-Fi Protected Setup Program 50 may include changes provided by the example embodiments of the invention to the existing Wi-Fi Protected Setup (WPS) 2.0 specification, to enable setting up a device-to-device wireless network with a second wireless device, using near-field communication signals in the out-of-band device-to-device connection setup. Also included are the existing Wi-Fi Protected Setup (WPS) 2.0 specification methods for NFC, including the Connection Handover specified for Infrastructure WLAN setup, Password Token (tag) for Infrastructure WLAN setup, and Configuration Token (tag) for Infrastructure WLAN setup.

Figure 5:
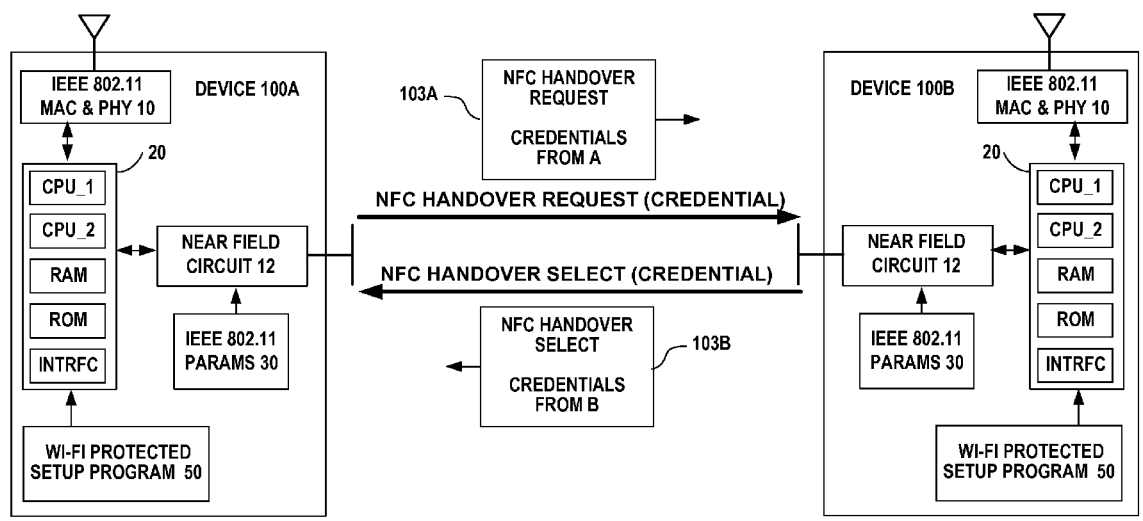
FIG. 5 is an example embodiment of a wireless network diagram of the two wireless devices of FIG. 1A, wherein the NFC handover request from device A includes credentials from device A and the NFC handover select from device B includes credentials from device B, according to an embodiment of the present invention.

FIG. 5 is an example embodiment of a wireless network diagram of the two wireless devices 100A and 100B of FIG. 1A, wherein the NFC handover request 103A from device A includes credentials from device A and the NFC handover select 103B from device B includes credentials from device B, according to an embodiment of the present invention. The credentials may include the IEEE 802.11 Service Set Identifier (SSID), authentication and encryption type deployed by the wireless network, the secret network key that a wireless station needs to authenticate with the network, and the MAC address of the device receiving the configuration (if unknown, this address is set to all-zeros). The credentials may also include additional parameters characterizing the current WLAN status etc. so that role determination may be performed immediately after NFC exchange without the need for further Wi-Fi in-band signaling. A new NDEF record is added to carry the additional information needed for role determination. FIGS. 2B1 and 2C1 show the NFC handover message format with the additional WLAN parameters for role determination in the carrier data NDEF record. FIGS. 2B2 and 2C2 show the NFC handover message format with the additional WLAN parameters for role determination in the auxiliary data NDEF record.

Example embodiments of the invention include an apparatus comprising:

means for initiating, by a first device, an out-of-band near-field communication connection with a second device by transmitting wireless communication signals including necessary power for providing the near-field communication connection;

means for sending first short-range communication connection parameters for role determination, to the second device via the out-of-band near-field communication connection;

means for receiving second short-range communication connection parameters for role determination, from the second device via the out-of-band near-field communication connection;

means for selecting a role for the short-range communication connection by adopting short-range communication connection parameters for role determination that correspond to the role;

means for discarding short-range communication connection parameters for role determination that are not adopted; and means for initiating the short-range communication connection according to the selected role using the adopted short-range communication connection parameters for role determination.

Using the description provided herein, the embodiments may be implemented as a machine, process, or article of manufacture by using standard programming and/or engineering techniques to produce programming software, firmware, hardware or any combination thereof.

Any resulting program(s), having computer-readable program code, may be embodied on one or more computer-usable media such as resident memory devices, smart cards or other removable memory devices, or transmitting devices, thereby making a computer program product or article of manufacture according to the embodiments. As such, the terms "article of manufacture" and "computer program product" as used herein are intended to encompass a computer program that exists permanently or temporarily on any computer-usable medium or in any transmitting medium which transmits such a program.

As indicated above, memory/storage devices include, but are not limited to, disks, optical disks, removable memory devices such as smart cards, SIMs, WIMs, semiconductor memories such as RAM, ROM, PROMS, etc. Transmitting mediums include, but are not limited to, transmissions via wireless communication networks, the Internet, intranets, telephone/modem-based network communication, hard-wired/cabled communication network, satellite communication, and other stationary or mobile network systems/communication links.

Although specific example embodiments have been disclosed, a person skilled in the art will understand that changes can be made to the specific example embodiments without departing from the spirit and scope of the invention.

What is claimed is:

1. A method, comprising:
    initiating, by a first device, an out-of-band near-field communication connection with a second device by transmitting wireless communication signals for providing the near-field communication connection;
    sending first short-range communication connection parameters for role determination, to the second device via the out-of-band near-field communication connection;
    receiving second short-range communication connection parameters for role determination, from the second device via the out-of-band near-field communication connection;
    selecting a role for the short-range communication connection by adopting one of the first or the second short-range communication connection parameters for role determination that corresponds to the selected role;
    discarding one of the first or the second short-range communication connection parameters for role determination that is not adopted; and
    initiating the short-range communication connection according to the selected role using the adopted one of the first or the second short-range communication connection parameters for role determination.

2. The method of claim 1, wherein the out-of-band near-field communication connection is based on an NFC Forum Logical Link Control Protocol and the first and second devices use an NFC Forum Connection Handover protocol to exchange the first and second short-range communication connection parameters for role determination.

3. The method of claim 2, wherein an NFC handover request message sent to the second device in the NFC Forum Connection Handover protocol, includes an NDEF record to carry the parameters for role determination.

4. The method of claim 3, wherein the parameters for role determination are carried in a carrier configuration data credential in a carrier data NDEF record.

5. The method of claim 4, wherein the short-range communication connection is an IEEE 802.11 wireless network and the carrier configuration data credential includes an IEEE 802.11 Service Set Identifier, authentication and encryption type deployed by the wireless network, a network key that a wireless station needs to authenticate with the network, and a MAC address of a device receiving the configuration, if known.

6. The method of claim 3, wherein the parameters for role determination are carried in an auxiliary data NDEF record.

7. The method of claim 2, wherein an NFC handover select message received from the second device in the NFC Forum Connection Handover protocol, includes an NDEF record to carry the parameters for role determination.

8. The method of claim 7, wherein the parameters for role determination are carried in a carrier configuration data credential in a carrier data NDEF record.

9. The method of claim 8, wherein the short-range communication connection is an IEEE 802.11 wireless network and the carrier configuration data credential includes an IEEE 802.11 Service Set Identifier, authentication and encryption type deployed by the wireless network, a network key that a wireless station needs to authenticate with the network, and a MAC address of a device receiving the configuration, if known.

10. The method of claim 7, wherein the parameters for role determination are carried in an auxiliary data NDEF record.

11. The method of claim 1, wherein the first device selects a registrar role for the short-range communication connection by adopting short-range communication connection parameters for role determination that correspond to the registrar role and discards the second short-range communication connection parameters for role determination that are not adopted.

12. The method of claim 1, wherein the first device selects an enrollee role for the short-range communication connection by adopting short-range communication connection parameters for role determination that correspond to the enrollee role and discards the first short-range communication connection parameters for role determination that are not adopted.

13. The method of claim 1, wherein the selecting a role for the short-range communication connection is made by negotiation over the out-of-band near-field communication connection, based on information in the first and second short-range communication connection parameters exchanged with the second device.

14. The method of claim 1, wherein the selecting a role for the short-range communication connection is made by negotiation over both the out-of-band near-field communication connection and over the short-range communication connection, based on information in the first and second short-range communication connection parameters exchanged with the second device.

15. A device, comprising:
    at least one processor;
    at least one memory including computer program code;
    the at least one memory and the computer program code configured to, with the at least one processor, cause the device at least to:
    initiate an out-of-band near-field communication connection with a second device by transmitting wireless communication signals for providing the near-field communication connection;
    send first short-range communication connection parameters for role determination, to the second device via the out-of-band near-field communication connection;
    receive second short-range communication connection parameters for role determination, from the second device via the out-of-band near-field communication connection;
    select a role for the short-range communication connection by adopting one of the first or the second short-range communication connection parameters for role determination that corresponds to the selected role;
    discard one of the first or the second short-range communication connection parameters for role determination that is not adopted; and
    initiate the short-range communication connection according to the selected role using the adopted one of the first or the second short-range communication connection parameters for role determination.

16. The device of claim 15, wherein the out-of-band near-field communication connection is based on an NFC Forum Logical Link Control Protocol and the wireless and second devices use an NFC Forum Connection Handover protocol to exchange the first and second short-range communication connection parameters for role determination.

17. The device of claim 16, wherein the short-range communication connection is an IEEE 802.11 wireless network and the short-range communication connection parameters for role determination include an IEEE 802.11 Service Set Identifier, authentication and encryption type deployed by the wireless network, a network key that a wireless station needs to authenticate with the network, and a MAC address of a device receiving the configuration, if known.

18. The device of claim 15, wherein the device further comprises a near-field communication device using a short-range high frequency wireless communication technology enabling the exchange of data with the second device.

19. The device of claim 18, wherein the short-range high frequency wireless communication technology is an extension of ISO/IEC 14443 proximity-card standard that combines an interface of a smartcard and a reader into a single device.

20. The device of claim 19, wherein the device uses ISO/IEC 18092 communication standard to enable two-way communication with the second device.

21. The device of claim 15, wherein the device includes a radio frequency identification transponder and a radio frequency identification reader circuit associated as a unitary component capable of two-way communication.

22. A computer readable non-transitory medium storing program instructions, which when executed by a computer processor, perform the steps comprising:

initiating an out-of-band near-field communication connection with a second device by transmitting wireless communication signals for providing the near-field communication connection;

sending first short-range communication connection parameters for role determination, to the second device via the out-of-band near-field communication connection;

receiving second short-range communication connection parameters for role determination, from the second device via the out-of-band near-field communication connection;

selecting a role for the short-range communication connection by adopting one of the first or the second short-range communication connection parameters for role determination that corresponds to the selected role;

discarding one of the first or the second short-range communication connection parameters for role determination that is not adopted; and initiating the short-range communication connection according to the selected role using the adopted one of the first or the second short-range communication connection parameters for role determination.

23. The computer readable non-transitory medium storing program instructions of claim 22, which when executed by a computer processor, perform the step further comprising:

selecting a registrar role by adopting the first short-range communication connection parameters and discarding the second short-range communication connection parameters for role determination that are not adopted.

24. The computer readable non-transitory medium storing program instructions of claim 22, which when executed by a computer processor, perform the step further comprising:

selecting an enrollee role by adopting the second short-range communication connection parameters and discarding the first short-range communication connection parameters for role determination that are not adopted.

* * * * *